United States Patent [19]

Allison

[11] 4,062,637
[45] Dec. 13, 1977

[54] STEERING LINKAGE AND TIE ROD ASSEMBLY

[75] Inventor: William D. Allison, Grosse Pointe Farms, Mich.

[73] Assignee: Ford Motor Company, Dearborn, Mich.

[21] Appl. No.: 593,807

[22] Filed: July 7, 1975

[51] Int. Cl.² ............................................. F16C 11/06
[52] U.S. Cl. ................................... 403/151; 403/224
[58] Field of Search ................... 403/151, 2, 220, 224, 403/225, 228, 335, 340; 29/463

[56] References Cited

U.S. PATENT DOCUMENTS

| Re. 24,758 | 12/1959 | Thiry | 403/224 |
|---|---|---|---|
| 1,909,100 | 5/1933 | Geyer | 403/228 X |
| 1,913,513 | 6/1933 | Rossman et al. | 403/224 X |
| 2,103,729 | 12/1937 | Leighton | 403/224 |
| 2,346,574 | 4/1944 | Guy | 403/224 |
| 2,814,538 | 11/1957 | Connolly | 403/140 X |
| 2,993,715 | 7/1961 | Hutton | 403/224 |

Primary Examiner—Wayne L. Shedd
Attorney, Agent, or Firm—Clifford L. Sadler; Keith L. Zerschling

[57] ABSTRACT

A tie rod end assembly for a motor vehicle steering linkage system and the method for making the assembly is disclosed. The tie rod end comprises first and second housing parts that are stamped of sheet metal and have substantially identical configuration. Each part has a semi-cylindrical stem portion and an eye portion. The eye portion has a generally channel shape in cross section with an inner frusto-conical wall and an outer curved wall that is a continuation of the wall forming the stem portion. The two housing parts are fitted together and welded along the abutting edges of the outer walls and stem portions. The inner walls define a convergent-divergent opening in which an annular elastomeric bushing is fitted. The stem portions of the two housings are internally threaded for attachment to a steering member and a fastener is fitted through the elastomeric bushing for attachment to another steering member.

1 Claim, 3 Drawing Figures

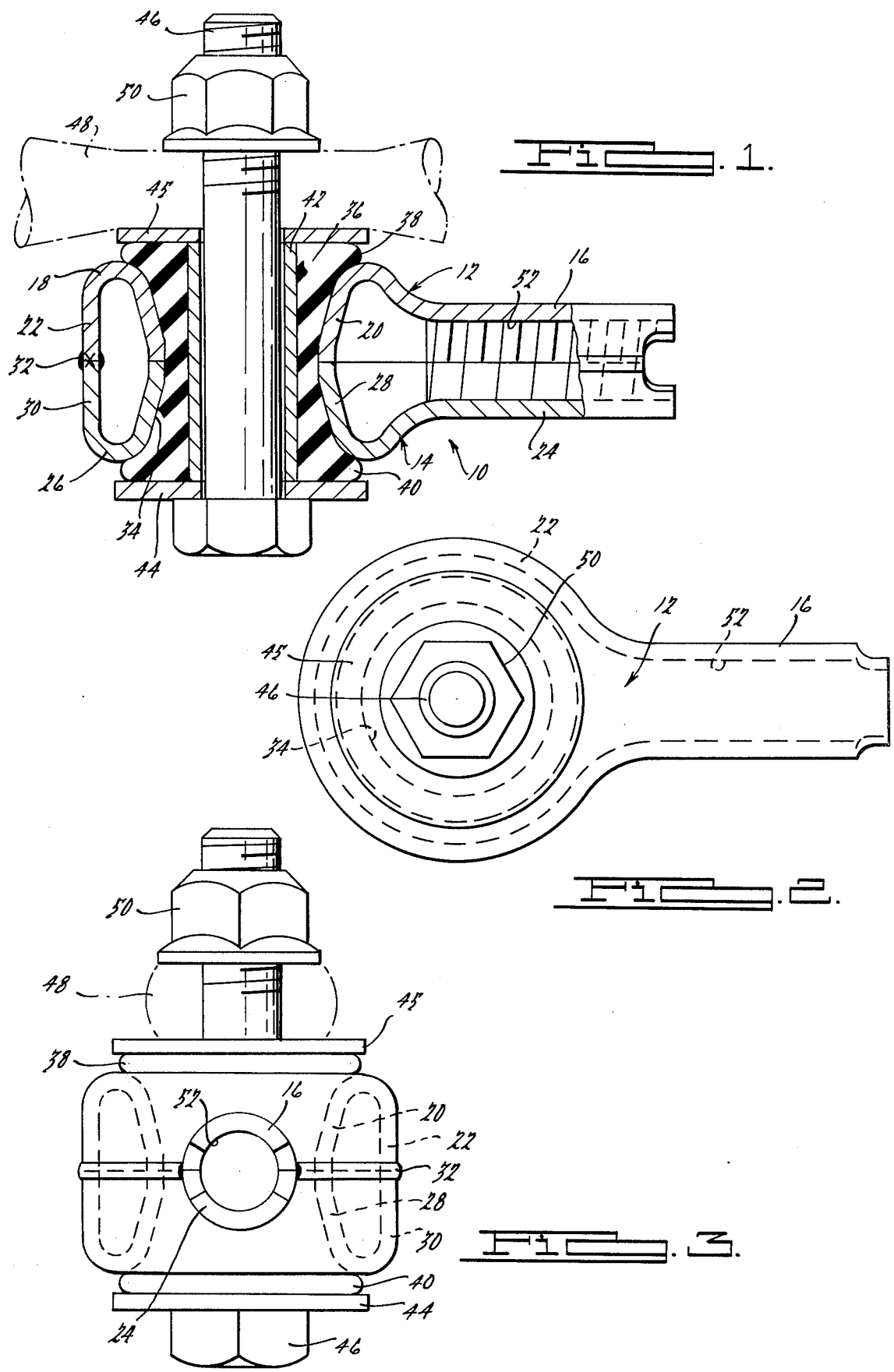

STEERING LINKAGE AND TIE ROD ASSEMBLY

BACKGROUND AND SUMMARY OF THE DISCLOSURE

The present invention relates to a tie rod end assembly for a motor vehicle steering system. A tie rod end according to the present invention provides an economically constructed pivot for joining elements of a steering linkage system.

In its presently preferred embodiment, the tie rod end of this invention has first and second housing parts that are of substantially identical construction. Each of the housing parts has a stem portion and an eye portion. The stem portion has a generally semi-cylindrical configuration. The eye portion has a generally U-shape in cross section with an inner frusto-conical wall and an outer wall that forms an extension of the semi-cylindrical stem. The first and second housing parts are arranged with the edges of the inner walls, the outer walls and the semi-cylindrical stem portions in abutting relationship. A weldment bead rigidly inteconnects the abutting edges of the outer wall and of the semi-cylindrical stem.

The inner frusto-conical walls of the first and second housing parts combine to form a convergent-divergent opening in which an annular elastomeric bushing is fitted. A sleeve is positioned within the annular elastomeric element and a fastener extends through the sleeve for connecting the tie rod end to a steering link. The inner surface of the stem portions is threaded so that the tie rod end assembly may be connected to another steering system member.

BRIEF DESCRIPTION OF THE DRAWINGS

The many objects and advantages of a tie rod end assembly constructed in accordance with this invention will become apparent upon consideration of the following detailed description and the accompanying drawings, in which:

FIG. 1 is a side elevational view partly in section of a new tie rod end construction;

FIG. 2 is a top plan view of the tie rod end of FIG. 1; and

FIG. 3 is an elevational view of the stem end of the tie rod end of FIG. 1.

DETAILED DESCRIPTION OF A PREFERRED EMBODIMENT

Referring now to the drawings wherein the presently preferred embodiment of this invention is disclosed, FIG. 1 shows a tie rod end assembly 10 which has an upper housing part 12 and a lower housing part 14. The housing parts 12 and 14 are of substantially identical configuration. Housing part 12 has a stem portion 16 of generally semi-cylindrical shape and an eye portion 18 which has a generally channel shape in cross section. The eye 18 is formed by an inner frusto-conical wall 20 and an outer wall 22 which forms an extension of the semi-cylindrical stem 16. Similarly, the lower housing part 14 has a semi-cylindrical stem portion 24 and an eye 26. The eye 26 comprises an inner frusto-conical wall 28 and an outer wall 30.

The upper and lower housing parts 12 and 14 are arranged with the edges of the semi-cylindrical portion 16 and the outer wall 22 of housing part 12 in abutting relationship with the edges of the semi-cylindrical stem portion 24 and the outer wall 30 of the lower housing part 14. A weldment bead 32 rigidly interconnects the abutting edges.

The edge of the frusto-conical wall 20 abuts the edge of the frusto-conical wall 28 and the two walls 20 and 28 define a convergent-divergent opening 34. An annular elastomeric bushing 36 is positioned within the opening 34. The bushing 36 is of greater length than the axial length of the opening 34 and end flanges 38 and 40 of elastomeric material extend beyond the axial limits of the opening 34. A cylindrical sleeve 42 is positioned within the annular bushing 36. The bushing 36 is loaded in compression and its internal compressive forces retain it within the convergent-divergent opening 34.

A washer 44 is positioned against the lower end of the sleeve 42 and against the bulging edge 40 of the bushing 36. Similarly, a washer 45 is positioned against the upper end of the sleeve 42 and against the bulging edge 38. A bolt 46 extends through the washers 44 and 45 and the sleeve 42 and is secured to a link 48 of a vehicle steering linkage system by a nut 50.

When the nut 50 is tightened, the elastomeric bushing 36 is compressed between the washers 44 and 45. The sleeve 42 limits the extent to which the nut 50 may be tightened and, therefore, the extent to which the elastomeric bushing 36 may be compressed. The sleeve 42 functions as a device for controlling preload in the tie rod end assembly 10.

The stem portions 16 and 24 of the housing parts 12 and 14 form a hollow stem for the tie rod end that is internally threaded as indicated by reference numeral 52. The threads 52 provide a means for attaching the tie rod end assembly 10 to another member of the vehicle steering system.

In summary, a tie rod end assembly according to the present invention is characterized by its simplicity of construction and its economy of manufacture. The housing parts 12 and 14 are stamped of sheet metal and are interchangeable. They are secured together by a simple butt welding operation along the seam formed by the abutting edges of the housing parts. The convergent-divergent opening 34 effectively retains the compressed elastomeric bushing 36 in position.

The foregoing description presents a preferred embodiment of this invention. Alterations and modifications may occur to those skilled in the art that will come within the scope and spirit of the following claims.

I claim:

1. A tie rod end assembly having first and second sheet metal housing parts of substantially identical configuration;
    each of said housing parts having an elongated stem portion with a generally semi-cylindrical wall;
    each of said housing parts having an eye portion with a generally channel shape in cross section;
    said eye portions each being defined by an annulr frusto-conical wall and an outer wall that is a continuation of said semi-cylindrical wall;
    said first housing part being arranged with the edges of its said semi-cylindrical wall and said outer wall in abutting relationship to the edges of said semi-cylindrical wall and said outer wall of said second housing part;
    a weldment interconnecting said abutting edges of said semi-cylindrical walls and said outer walls;
    said frusto-conical walls of said first and second housing parts defining a convergent-divergent opening;
    an annular elastomeric element positioned in said convergent-divergent opening;

said elastomeric element having radially extending flanges at each of its ends that extend radially beyond the ends of said convergent-divergent opening;

a sleeve positioned within said elastomeric element constructed to limit the compression of said elastomeric element;

fastener means positioned within said sleeve and constructed to be connected to a steering member;

said stem portions of said first and second housing parts being internally threaded for attachment to another steering member.

* * * * *